INVENTOR.
John T. Cowles,
BY
Paul & Paul
ATTORNEYS.

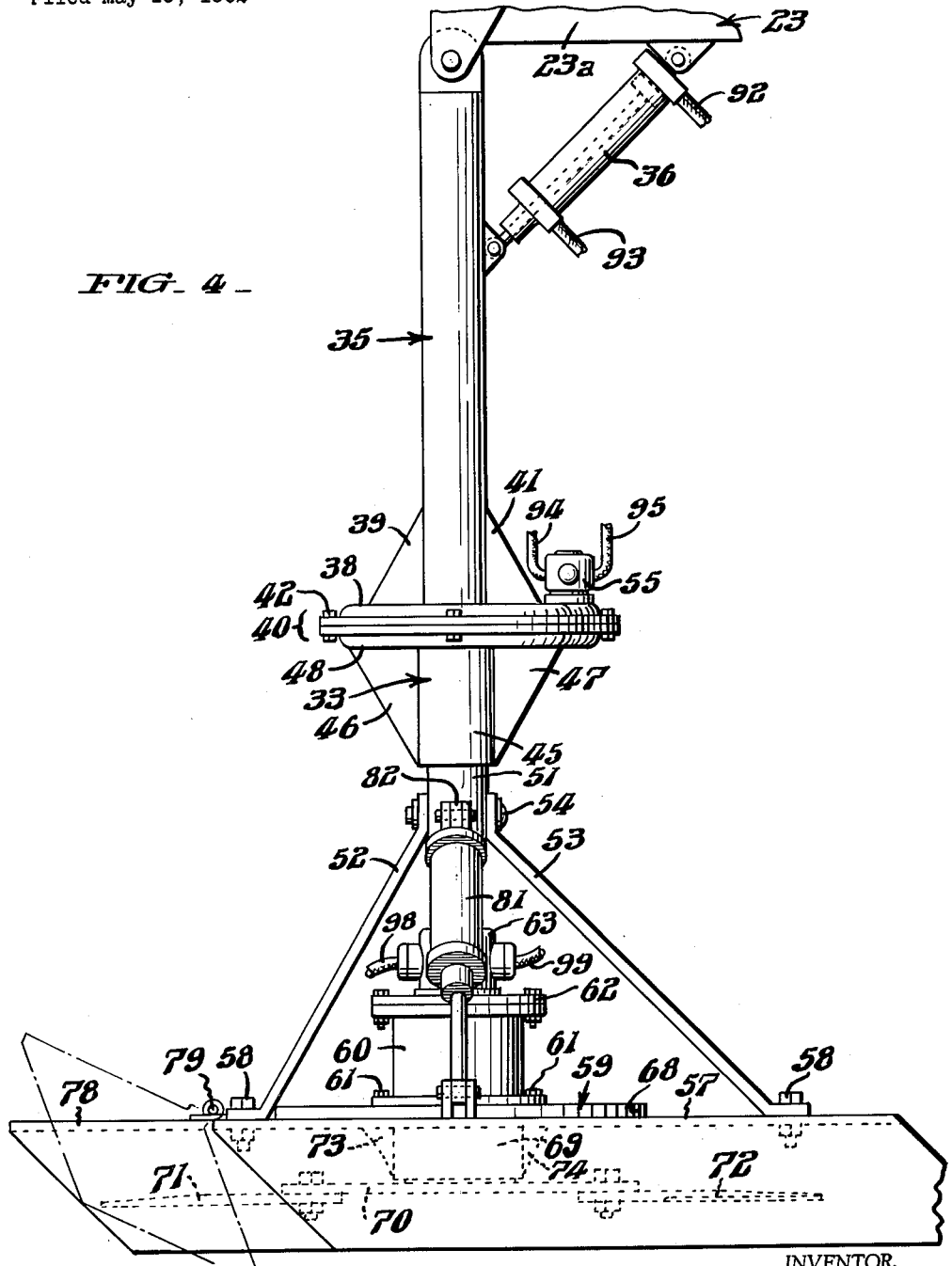

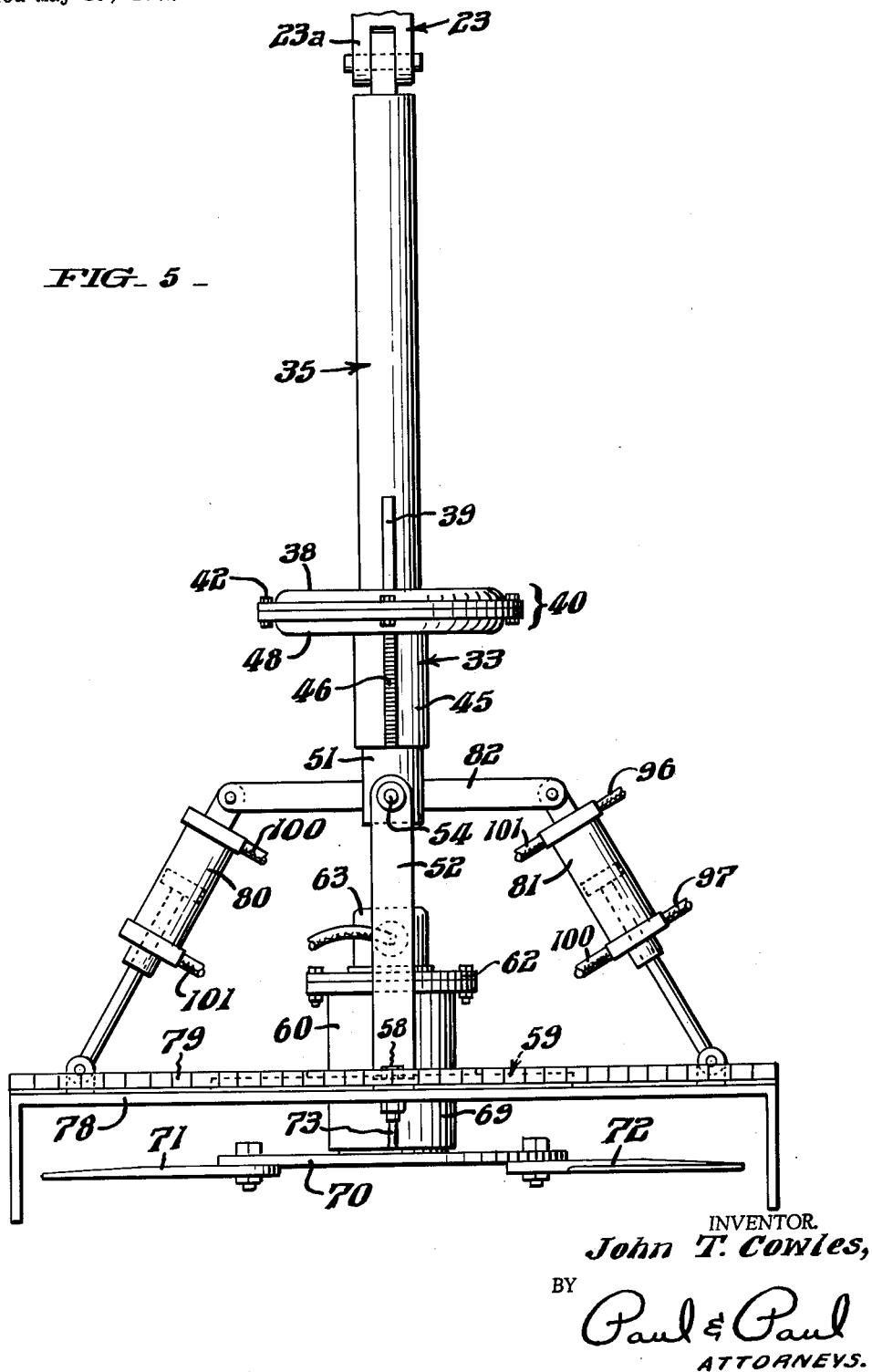

April 30, 1963 J. T. COWLES 3,087,296
BRUSH CUTTER
Filed May 15, 1962 6 Sheets-Sheet 5
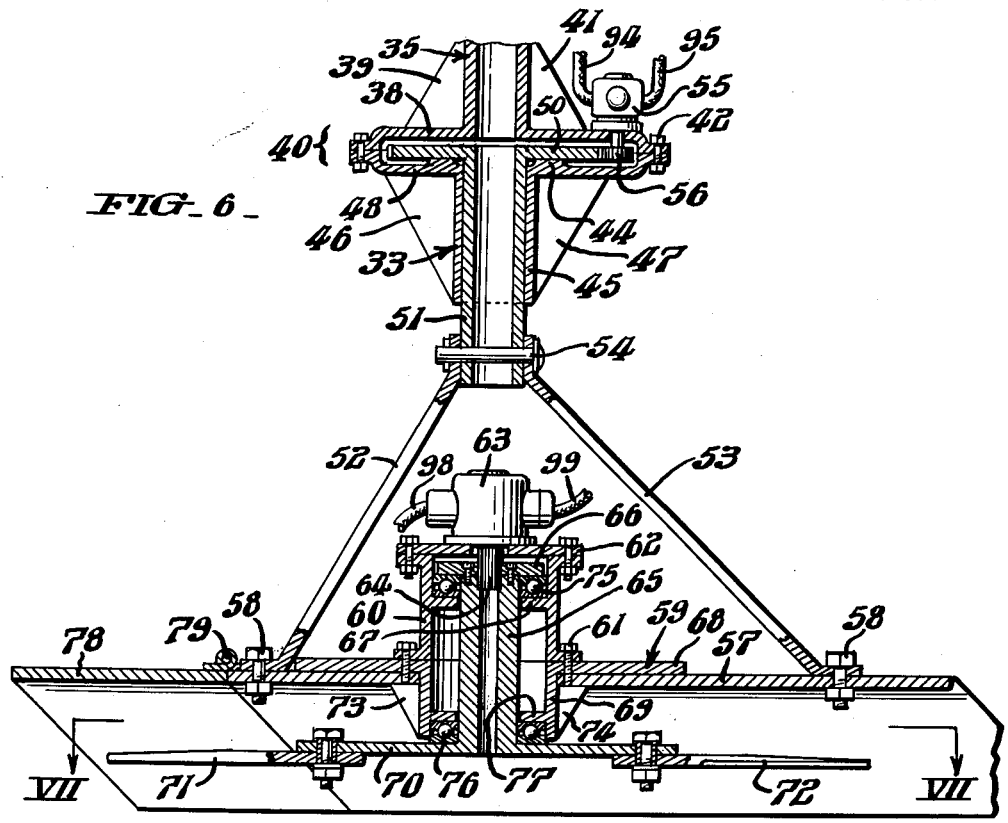
INVENTOR.
John T. Cowles,
BY
Paul & Paul
ATTORNEYS.

April 30, 1963
J. T. COWLES
3,087,296
BRUSH CUTTER
Filed May 15, 1962
6 Sheets-Sheet 6
*FIG. 8 -*
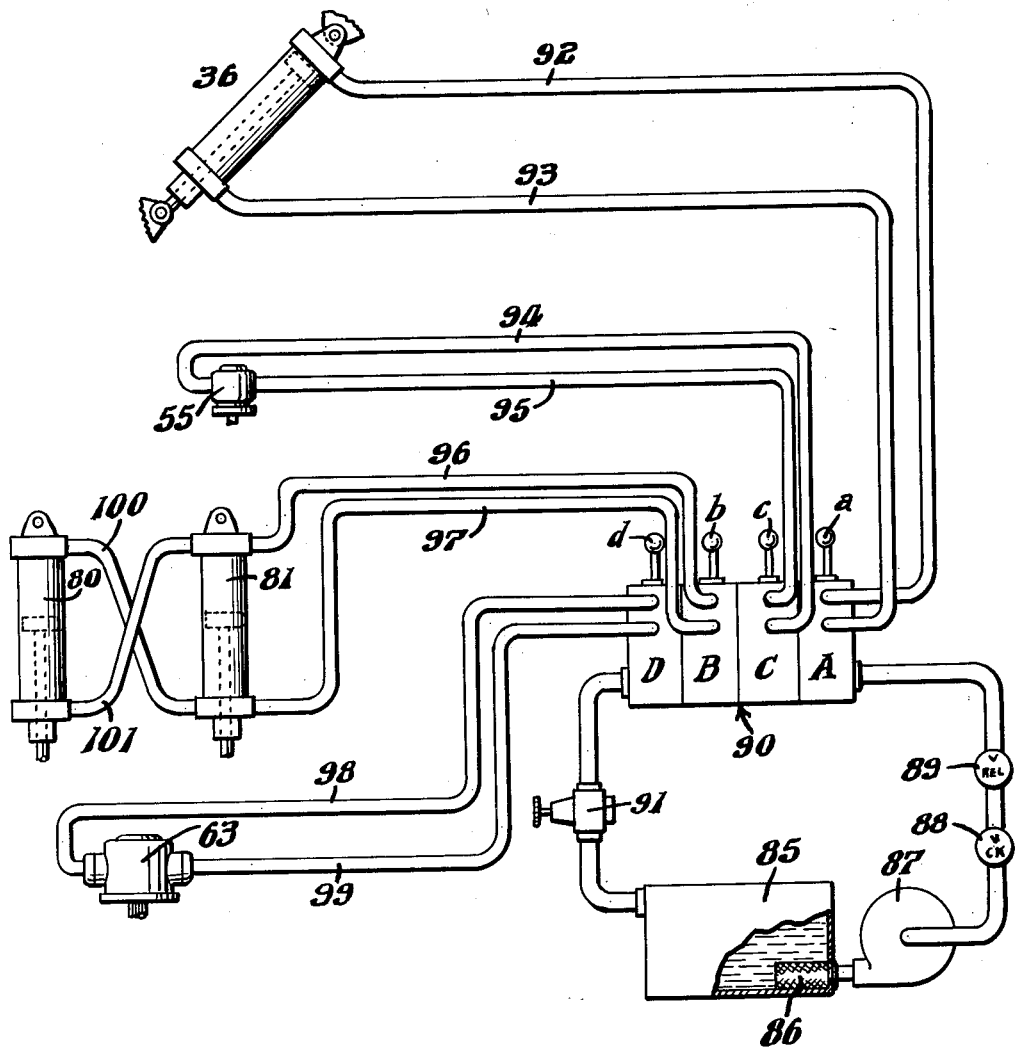
INVENTOR.
John T. Cowles,
BY
Paul & Paul
ATTORNEYS.

United States Patent Office 3,087,296
Patented Apr. 30, 1963

3,087,296
BRUSH CUTTER
John T. Cowles, 7 S. Jefferson Ave., Wenonah, N.J.
Filed May 15, 1962, Ser. No. 194,942
5 Claims. (Cl. 56—25.4)

This invention relates to improved mobile equipment adapted for cutting down bushes, shrubs, small trees, and other brush, and for mowing grass on either side of a railroad trackway or motor highway.

The principal object of the present invention is to provide a rugged, reliable, effective, and efficient cutter adapted to move along a trackway or highway for mowing grass and cutting down brush and small trees close to the ground on either side of the trackway or highway, substantially independently of the contour of the ground.

The invention will be best understood from a consideration of the following description of a preferred embodiment illustrated in the drawing, in which:

FIG. 4 is a diagrammatic side elevational view of the tongue and cutter portion of the equipment;

FIG. 5 is a front elevational view of the same portion shown in FIG. 4;

FIG. 6 is a diagrammatic side elevational view, in section, of a portion of the tongue and cutter;

FIG. 7 is a diagrammatic plan view of the energy disc and pivotal blades; and

FIG. 8 is a schematic representation of a hydraulic system suitable for controlling the operation of the brush cutter mechanism.

Figure 1:
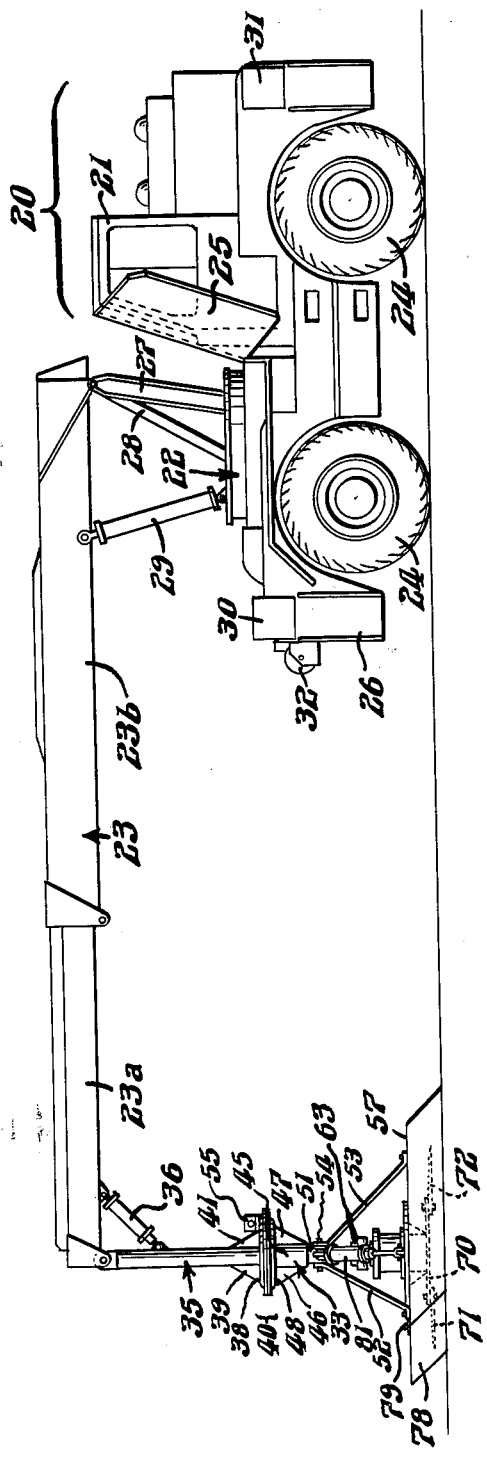
FIG. 1 is a diagrammatic side elevation illustrating my improved brush cutter equipment.

In describing a preferred embodiment of my invention, as illustrated in the drawing, specific terminology is resorted to for the sake of clarity. However, it is not my intention to be limited to the specific terms so selected, and it is to be understood that each specific term includes all technical equivalents which operate in a similar manner to accomplish a similar purpose.

In preferred form, my improved brush cutter comprises a basic mobile unit 20, as seen in FIG. 1, which may be a known form of commercially available mobile hydraulic crane modified in accordance with my invention and converted into a hydraulically-powered mobile brush cutter having a number of attractive features and advantages.

The basic mobile unit 20 may, for example, be a Grove 12-ton hydraulic crane, model RT-57, manufactured by the Grove Manufacturing Company of Shady Grove, Pennsylvania. Such a unit is illustrated in FIG. 1, and is seen to be a four-wheel unit having a cab 21, a turntable 22, and a telescoping boom 23. While not illustrated, the unit 20 may be powered by an automotive-type of six-cylinder or eight-cylinder gasoline engine, or by a diesel engine, or by an LP gas engine. It is equipped with a four-speed full reversing transmission with a two-speed transfer case, thus providing eight speeds forward and reverse. For brush cutter use, cab 21 is provided with a safety screen or shield 25 to protect the cab occupant against flying pieces.

In FIG. 1, the mobile unit 20 is illustrated as equipped with tired wheels 24, but if intended for use on a railroad trackway as well as on a highway, the unit would also be equipped with flanged steel wheels (not shown) suitable for rolling along railroad tracks.

As available commercially from the Grove Manufacturing Company, both the turntable 22 and the telescoping boom 23 are operated by hydraulic power. The boom 23 may be either a two-section or three-section boom. In FIG. 1, a two-section boom is illustrated, with the inner boom section 23a protruding partially from the outer boom section 23b. When fully extended, the end of the boom may be twenty-four feet in front of the front bumper 26 of the mobile unit.

The turntable 22 is a ball-bearing turntable rotatable under positive hydraulic control through 360°. Thus, the boom 23 is adapted to be swung through 360° of continuous rotation.

The boom 23 is mounted on the turntable 22 by means of standards 27 and braces 28 fixed to the turntable. The boom 23 may be pivotally raised or hoisted by the boom cylinder 29 to an angle of 65° relative to the horizontal. The mobile unit may be equipped with outriggers 30 and 31 at the front and rear ends, respectively, and with a winch 32 at the front end. The outriggers 30 and 31 are hydraulically operated and controlled, each side being controlled independently so that any individual outrigger may be set as needed. Steering is provided on all four wheels with independent hydraulic control of both axles. The unit has a road speed of 15 m.p.h. and a weight of the order of 30,000 pounds.

The unit thus far described is a known and commercially available form of mobile hydraulic crane and may, for example, be a Grove model RT-57.

In accordance with my present invention, a brush cutter mechanism is suspended from the front end of the boom 23, hydraulically powered and controlled by means to be described.

Referring now specifically to FIGS. 1, 4, and 5, an elongated hollow cylindrical tube or tongue 35 is pivotally suspended from the forward end of the inner extendible section 23a of boom 23. Tongue 35 is movable pivotally in the vertical plane of the boom 23 and may be pivotally moved either away from or toward the mobile unit 20 by the hydraulically controlled cylinder 36, connected between boom section 23a and tongue 35.

As illustrated in FIGS. 1, 4, and 5, and as seen in detail in FIG. 6, the lower end of the tubular tongue 35 is provided with an integral external flange 38 of substantial diameter and of inverted dished configuration. The structure is strengthened by oppositely disposed angular plate members 39 and 41 which serve as braces. The periphery of flange 38 is provided with a plurality of bolt holes for securing thereto, as by the bolts 42, the opposing or complementing dished flange 48 of a T-shaped member 33. The two dished flanges 38 and 48 together form a rotator housing 40 for receiving the rotator spur gear 50. The upper surface of flange 48 is provided with an annular bearing surface 44 for supporting the rotator spur gear 50 and on which it turns. The lower portion of T-member 33 constitutes a hollow cylindrical portion 45 for receiving, and taking the radial thrust of, the hub 51 of spur gear 50. The structure is strengthened by the oppositely disposed angle plates 46 and 47.

The hub 51 of the rotator spur gear 50 is tubular and extends beyond the end of the portion 45 of the T-member 33. The gear hub 51 thus forms a rotatable tip for the tongue 35. Pivotally secured to the lower end of the rotatable hub 51, as by a pivot pin 54, is a pair of oppositely disposed angular pivot braces 52 and 53. Also secured to the lower end of rotatable hub 51 is a horizontal support arm 82 to which a pair of orientation cylinders 80 and 81 are pivotally connected, as shown in FIGS. 2–5 and as will be described.

Returning to FIGS. 4 and 6, mounted on the outer surface of flange 38 is a hydraulic rotator motor 55 having a vertically disposed drive shaft which enters the rotator housing 40 and has secured to the end thereof a rotator pinion 56, the teeth of which are in engagement with those of spur gear 50.

The angularly-disposed pivot braces 52 and 53 support from pivot pin 54, or hold up, a horizontally-disposed platform 57, bolted to the lower ends of the braces 52, 53, by the bolts 58. Platform 57 is provided with a central circular hole for receiving a mounting flange 59 on which the main drive shaft housing 60 is supported. Mounting flange 59 comprises an annular horizontally-disposed flange portion 68 and a depending hollow cylindrical portion 69. When the mounting flange 59 is in position, as shown in FIG. 6, additional strength is provided by the angle plates 73 and 74.

The main drive shaft housing 60 is a hollow cylindrical housing disposed on mounting flange 59 in coaxial alignment wiht the central openings in flange 59 and platform 57. Bolts 61 secure the shaft housing 60 and also the mounting flange 59 to the platform 57. Secured, as by bolts, to the upper end of the main shaft housing 60 is a cover plate 62 on which is mounted a hydraulic motor 63 having a depending spline shaft 64 which passes through a hole in cover plate 62 and into engagement with the upper end of main shaft 65. Main shaft 65 is rotatably supported within the main shaft housing 60 by a spanner nut or support plate 66 secured to the upper end of the main shaft 65. A ball-bearing unit 75 supports the main shaft 65 on the upper internal flange 67 of the main shaft housing 60. Secured, as by welding, to the lower end of the main shaft 65 is a horizontally-disposed energy disc 70. A thrust bearing 76 is provided between a lower internal flange 77 of the main shaft housing 60 and the horizontally-disposed energy disc 70.

Pivotally secured to the energy disc 70, as on 3″ pivot pins, in diametrically opposed positions, are the cutter bars or blades 71 and 72, having hardened tool edges. When the energy disc 70 is rotated at high speed, for example, 600–900 r.p.m. in the direction of the arrow in FIG. 7, the blades 71 and 72, due to centrifugal force, assume the radial positions indicated in the solid line representations in FIG. 7. In such positions, the blades cut, for example, a 7-foot circle. Each of the blades 71 and 72 is pivotally free to swing rearwardly on its pivot pin (as indicated by the dot-and-dash line representation of blade 72) when meeting an obstruction of a type through which the blade is unable to cut.

The forward part of the platform 57 (the left part as viewed in FIGS. 1, 4, and 6) is provided with a trap-door section 78 hinged on hinge 79 for upward pivotal movement. To assure return of the trap-door section, hinge 79 may be spring biased, or the trap door may be weighted, or allowed to return by its own weight. The entire platform 57 may, for example, have a weight of the order of 1800 pounds.

The forward edge of trap-door section 78 is inclined inwardly so that when the platform 57 is urged forward against an obstruction, such as a tree or other brush, the obstruction cams the trap-door section 78 upward, thereby exposing the blades 71, 72 of the cutter and thereby enabling the blades to cut down the tree or brush, or to cut through trees of substantial diameter by repeated and progressive partial cuts.

Figure 2:
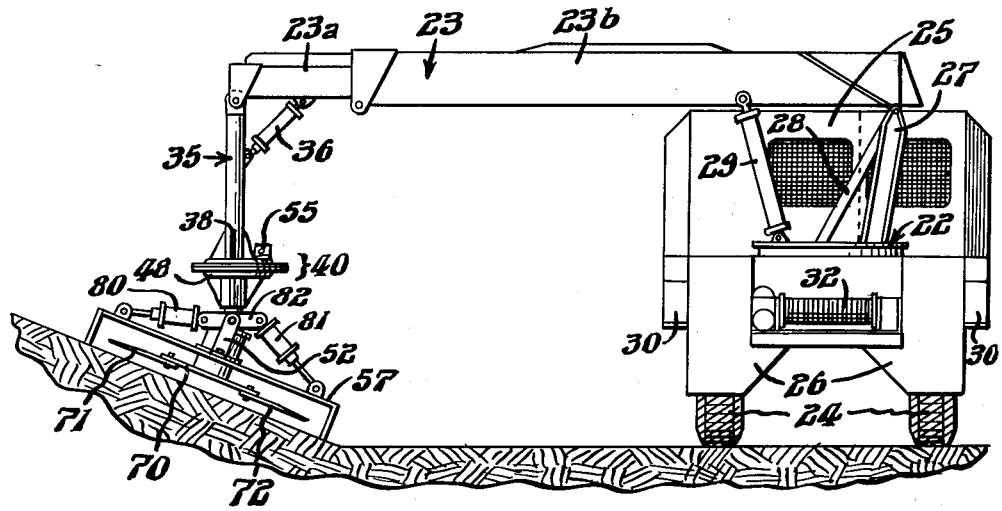
FIGS. 2 and 3 are diagrammatic front elevations showing the cutter operating on sloping ground to the left and to the right, respectively, of the mobile unit, as viewed in the drawing.
Figure 3:
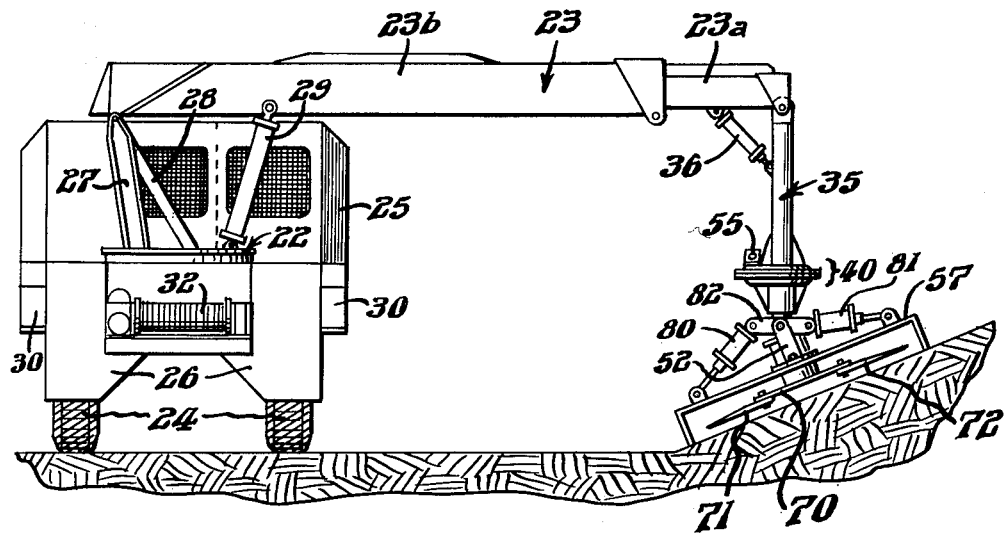

The platform 57 is adapted to be inclined from the horizontal either to the left or to the right, as illustrated in FIGS. 2 and 3. The means by which the platform is tilted are shown in FIGS. 4 and 5. As there shown, a pair of hydraulic orienting cylinders 80 and 81 are provided in opposing positions. The lower end of each of the orienting cylinders 80 and 81 is pivotally connected to the platform 57, and the upper end of each is pivotally connected to a rigid horizontally-disposed support bar 82 which is secured in fixed horizontal position to the lower end of the gear hub 51 or rotatable tip of tongue 35.

As has already been indicated, the brush cutter is operated and controlled hydraulically. FIG. 8 is a schematic representation of a hydraulic system suitable for operation of the brush cutter mechanism per se. No effort has been made to show the hydraulic system which controls the rotation of the turntable 42, or the extension or retraction of the telescopic boom 23, or the angular elevation of the boom 23, since such hydraulic system is a part of the commercially available mobile unit 20.

Referring again to FIG. 8, fluid from a supply or sump tank 85 is drawn through a strainer 86 by pump 87 and pumped through check valve 88 and relief valve 89 into the multi-section valve body 90. A pressure regulating valve 91 is provided in the return line from the valve body 90 to the tank 85. Pump 87 may, for example, be a 65–100 g.p.m. pump manufactured by the Denison Hydraulic Company of Columbus, Ohio. The valve body 90 comprises four separate sections, A, B, C, and D, each separately controlled by a separate hand lever $a$, $b$, $c$, and $d$, respectively. The positions of the control levers $a$, $b$, $c$, and $d$ control the application, and direction of application, of fluid pressure to the lines 92—99 which emanate from and return to the valve body 90. Except for the terminal portions, which have been shown in FIGS. 4–6, fluid pressure lines have been omitted from the diagrammatic representations in order to simplify the drawing.

Valve A controls fluid pressure through lines 92, 93 to the tongue cylinder 36 and thus controls the angular position of tongue 35 relative to the vertical.

Valve B controls the fluid pressure through lines 96, 97 to the pair of orientation cylinders 80 and 81 and thus controls the tilt or angle of inclination of the platform 57. Cylinders 80 and 81 are connected in cross-over fashion by lines 100 and 101 so that when fluid pressure is applied, for example, in a direction to extend the piston rod of cylinder 81, the same fluid pressure functions to retract the piston rod of cylinder 80.

Valve C controls fluid pressure through lines 94, 95 to the hydraulic rotator motor 55 and thus controls the planar orientation of the platform 57. Motor 55 may, for example, be a 7 H.P. reversible vane-type fluid motor, made by the Denison Hydraulic Company, Columbus, Ohio. Platform 57 is moved by means of the fluid motor 55, pinion 56, and spur gear 50 through 180° in either direction from the normal, the normal being assumed to be that position of the platform 57 in which the trap-door portion 78 is forward and centered in the vertical plane of the boom 23.

Valve D controls fluid pressure through lines 98, 99 to the hydraulic cutter motor 63 and thus controls the high speed rotation of the energy disc 70. Cutter motor 63 may, for example, be a 50 H.P. vane-type fluid motor made by the Denison Hydraulic Company.

It will be understood, of course, that the hand controls $a$, $b$, $c$, and $d$ are preferably located in the cab 21 of the mobile unit 20, together with the hand controls, not shown, for controlling the boom. The boom is extendible, for example, to 24 feet, may be inclined to 65°, and may be rotated through 360°.

It will be seen that by controlling the length, planar orientation, and inclination of the boom 23, the angular suspension position of tongue 35, and the inclination and planar orientation of the platform 57, the energy disc and cutter blades may be readily placed by the cab operator in a suitable position for mowing grass or cutting down brush close to the ground irrespective of the slope of the ground on either side of the trackway or highway.

While the preferred embodiment of this invention has been described in some detail, it will be obvious to one skilled in the art that various modifications may be made without departing from the invention as hereinafter claimed.

Having described my invention, I claim:

1. A mobile brush cutter comprising a self-propelled mobile unit equipped with a turntable having mounted thereon an extendible boom adjustably movable to positions between the horizontal and an elevated angle relative to the horizontal, said mobile unit having attached to the forward end of said extendible boom a brush cutter mechanism, said brush cutter mechanism comprising: an elongated tongue pivotally suspended in depending position from the forward end of said extendible boom and pivotable in the vertical plane of said boom; first fluid means for adjusting the position of said tongue relative to the vertical; a rotatable tip at the lower end of said tongue; first fluid motor means connected to said tip for adjusting the angular position thereof relative to the axis of said tongue; a platform suspended from said tip in a generally horizontal position; second fluid means for adjustably inclining said platform relative to the horizontal; an energy disc; means for rotatably suspending said energy disc beneath said platform in a plane having a fixed parallel relationship to that of said platform; second motor means connected to said energy disc for driving said energy disc rotationally at high speed; cutter blades pivotally secured to the peripheral portion of said energy disc; and control means mounted on said mobile unit coupled to both said fluid means and to both said motor means for separately controlling each of said fluid means and each of said motor means.

2. Apparatus as claimed in claim 1 characterized in that said platform is provided with a forward portion adapted to be cammed pivotally upward and rearward when pressed forward against an obstruction, thereby to allow said blades to contact said obstruction.

3. As an attachment to a self-propelled mobile unit having a turntable on which an extendible but axially non-rotational boom is mounted, the position of said boom relative to the horizontal being adjustable; a brush cutter mechanism suspended from the forward end of said boom, said brush cutter mechanism comprising: an elongated tongue pivotally suspended in dependent position from the forward end of said boom and pivotable in the vertical plane of said boom; first fluid cylinder means connected to said boom and to said tongue for adjusting the position of said tongue relative to the vertical; a rotatable tip connected to the lower end of said tongue; first fluid motor means supported on said tongue and connected to said tip for adjusting the angular position of said tip relative to the axis of said tongue; a platform suspended from said tip; second and third fluid cylinder means connected between said platform and said tip for adjusting the position of said platform relative to the horizontal; a rotatable energy disc suspended beneath said platform in fixed parallel relationship to said platform; second fluid motor means supported by said platform and connected to said energy disc for rotating said disc at high speed; cutter blades pivotally attached to a peripheral portion of said energy disc; control valve means mounted on said mobile unit; and fluid conduit means leading from said control valve means to said fluid cylinders and to said fluid motor means for separately controlling each of said fluid cylinder and motor means.

4. Apparatus as claimed in claim 3 characterized in that said platform is provided with a forward portion adapted to be cammed pivotally upward and rearward when pressed forward against an obstruction, thereby to allow said blades to contact said obstruction.

5. Apparatus as claimed in claim 3 characterized in that said rotatable tip comprises the dependent hub of a horizontally disposed gear supported within a housing connected to the lower end of said tongue, and further characterized in that said first fluid motor means includes a pinion in mesh with said gear and driven by said first fluid motor.

References Cited in the file of this patent

UNITED STATES PATENTS

| | | |
|---|---|---|
| 2,654,986 | Gold | Oct. 13, 1953 |
| 2,737,772 | Jacobsen | May 16, 1956 |
| 3,032,956 | Mullet | May 8, 1962 |
| 3,058,285 | Jolls | Oct. 16, 1962 |